United States Patent
Yoon et al.

(10) Patent No.: US 10,532,666 B2
(45) Date of Patent: Jan. 14, 2020

(54) POWER GENERATION SYSTEM AND POWER GENERATION METHOD FOR FUEL CELL VEHICLE

(71) Applicants: HYUNDAI MOTOR COMPANY, Seoul (KR); KIA MOTORS CORPORATION, Seoul (KR)

(72) Inventors: Sung Gone Yoon, Suwon-si (KR); Jae Yeong Yoo, Yongin-si (KR)

(73) Assignees: HYUNDAI MOTOR CORPORATION, Seoul (KR); KIA MOTORS CORPORATION, Seoul (KR)

(*) Notice: Subject to any disclaimer, the term of this patent is extended or adjusted under 35 U.S.C. 154(b) by 100 days.

(21) Appl. No.: 15/719,295

(22) Filed: Sep. 28, 2017

(65) Prior Publication Data

US 2018/0326865 A1 Nov. 15, 2018

(30) Foreign Application Priority Data

May 11, 2017 (KR) .................. 10-2017-0058403

(51) Int. Cl.
*B60L 11/18* (2006.01)

(52) U.S. Cl.
CPC ....... *B60L 11/1887* (2013.01); *B60L 2210/10* (2013.01); *B60L 2240/526* (2013.01); *B60L 2240/54* (2013.01)

(58) Field of Classification Search
CPC .............. B60L 11/1801; B60L 11/1811; B60L 11/1862; B60L 11/1887; B60L 2210/10;
(Continued)

(56) References Cited

U.S. PATENT DOCUMENTS

2010/0194318 A1* 8/2010 Aso ................. H02J 7/34
318/400.3
2013/0244828 A1* 9/2013 Kayano ............. B60L 3/00
477/7
(Continued)

FOREIGN PATENT DOCUMENTS

JP 5350067 B2 11/2013
JP 2015-220949 A 12/2015
(Continued)

*Primary Examiner* — Jared Fureman
*Assistant Examiner* — Emmanuel Dominique
(74) *Attorney, Agent, or Firm* — Morgan, Lewis & Bockius LLP (57) ABSTRACT

A power generation system and a power generation method for a fuel cell vehicle, the power generation system comprising a main line that sequentially and electrically connects a fuel cell, a high voltage DC-DC converter, and a high voltage battery; an external power consumption device connecting unit; and a controller that controls the fuel cell or the high voltage DC-DC converter by selecting a mode for supplying power to an external power consumption device by using only power generated by the fuel cell, a mode for supplying power to the external power consumption device by using only the high voltage battery, or a mode for operating the fuel cell or the high voltage DC-DC converter in a high efficiency output interval, according to power consumption of the external power consumption device.

12 Claims, 5 Drawing Sheets

(58) Field of Classification Search
CPC ......... B60L 2240/526; B60L 2240/527; B60L 2240/54; Y02E 60/50; Y02T 90/34; Y10S 903/908
See application file for complete search history.

(56) References Cited

U.S. PATENT DOCUMENTS

| | | | |
|---|---|---|---|
| 2013/0245871 A1* | 9/2013 | Shirasaka | B60L 11/1881 701/22 |
| 2014/0080023 A1* | 3/2014 | Kim | H01M 8/04298 429/431 |
| 2018/0370366 A1* | 12/2018 | Suzuki | B60L 3/00 |

FOREIGN PATENT DOCUMENTS

| | | |
|---|---|---|
| KR | 10-2016-0147310 A | 12/2016 |
| WO | 2011-021263 A1 | 2/2011 |

* cited by examiner

POWER GENERATION SYSTEM AND POWER GENERATION METHOD FOR FUEL CELL VEHICLE

CROSS REFERENCE TO RELATED APPLICATION

The present application claims priority of Korean Patent Application No. 10-2017-0058403 filed on May 11, 2017, the entire contents of which is incorporated herein for all purposes by this reference.

TECHNICAL FIELD

The present disclosure relates to a power generation system and a power generation method for a fuel cell vehicle, which can improve both energy efficiency and durability in performing external power generation.

BACKGROUND

It is a recent trend that a fuel cell vehicle including a secondary battery, such as a fuel cell or a high voltage battery, is required to supply power to the outside. To this end, a DC output terminal port installed in the fuel cell vehicle may be connected to a separate external power supplier (inverter) to supply 220V/110V power, or an external power supply system power circuit may be added to allow direct receiving and using of 220V/110V power supplied through an external power supply inverter embedded in the vehicle.

When a power supply circuit for external power is branched from and is connected to a bus terminal of a high voltage battery in order to add an external power supply system as described above, the conventional power distribution control requires a control for high voltage battery SOC maintenance, in which charging and discharging of the battery are repeatedly performed due to power generated by the fuel cell, and the unnecessary charging and discharging reduces the efficiency.

The above description in this background section is only for improving understanding of the background of the present disclosure, and should not be taken as an acknowledgement indicating that the information forms a prior art that is already known to one of ordinary skill in the art.

SUMMARY

The present disclosure is proposed to solve this problem, and provides a power generation system and a power generation method for a fuel cell vehicle, which can improve both energy efficiency and durability in performing external power generation.

In accordance with the above aspect, a power generation system for a fuel cell vehicle according to the present disclosure includes a main line that sequentially and electrically connects a fuel cell, a high voltage DC-DC converter, and a high voltage battery; an external power consumption device connecting unit branched from a point between the high voltage DC-DC converter and the high voltage battery of the main line and arranged to be electrically connected to the main line; and a controller that controls the fuel cell or the high voltage DC-DC converter by selecting a mode for supplying power to an external power consumption device by using only power generated by the fuel cell, a mode for supplying power to the external power consumption device by using only the high voltage battery, or a mode for operating the fuel cell or the high voltage DC-DC converter in a high efficiency output interval, according to power consumption of the external power consumption device, when the external power consumption device is connected to the external power consumption device connecting unit.

The controller includes a memory that stores data relating to a high efficiency output interval of the fuel cell or a high efficiency output interval of the high voltage DC-DC converter, and a power deriving unit that derives power consumption of the external power consumption device.

The external power consumption device connecting unit may be an external power supply port connected to the main line through a relay.

The external power consumption device connecting unit may be an external power supply inverter connected to the main line.

The controller may derive power consumption of the external power consumption device from the difference between output power of the high voltage DC-DC converter and charge and discharge power of the high voltage battery.

The controller may stop power generation of the fuel cell by selecting a mode for supplying power to the external power consumption device by using only the high voltage battery when power consumption of the external power consumption device is equal to or lower than a reference value.

The reference value may be the lowest value in the high efficiency output interval of the fuel cell or the high efficiency output interval of the high voltage DC-DC converter.

In a case of selecting a mode for supplying power to the external power consumption device by using only the high voltage battery, the controller may operate the fuel cell and charge the high voltage battery while supplying power to the external power consumption device by using power generated by the fuel cell when a charge amount of the high voltage battery is equal to or less than the minimum charge amount.

When power consumption of the external power consumption device is equal to or higher than the reference value, the controller may select a mode for supplying power to the external power consumption device by using only power generated by fuel cell, and operate the fuel cell or the high voltage DC-DC converter in a high efficiency output interval.

In a case of selecting a mode for supplying power to the external power consumption device by using only power generated by the fuel cell, the controller may charge the high voltage battery while supplying power to the external power consumption device by using power generated by the fuel cell when a charge amount of the high voltage battery is equal to or less than a target charge amount.

A power generation method using the power generation system of the fuel cell vehicle according to the present disclosure includes: checking whether the external power consumption device is connected to the external power consumption device connecting unit; deriving power consumption of the external power consumption device when the external power consumption device is connected to the external power consumption device connecting unit; and supplying power to the external power consumption device by operating the fuel cell or the high voltage DC-DC converter in a high efficiency output interval, or supplying power to the external power consumption device by using only the high voltage battery, according to the size of power consumption of the external power consumption device.

Supplying of the power to the external power consumption device may include supplying power to the external power consumption device by using only the high voltage battery when power consumption of the external power consumption device is equal to or less than the reference value.

Supplying of the power to the external power consumption device may include supplying power to the external power consumption device while operating the fuel cell or the high voltage DC-DC converter in a high efficiency output interval when power consumption of the external power consumption device is equal to or higher than the reference value, and charging the high voltage battery while supplying power to the external power consumption device by using power generated by the fuel cell when a charge amount of the high voltage battery is equal to or less than the target charge amount.

A power generation system and a power generation method for a fuel cell vehicle according to the present disclosure provides an effect of improving the entire system efficiency by supplying power within high efficiency operation intervals of the fuel cell and the high voltage DC-DC converter when the power is supplied to an external power supply system.

Low power output and low efficiency operation of the fuel cell are prevented by temporarily stopping operating the fuel cell and directly supplying power of a high voltage battery to the external power supply system when power consumption of the external power supply system is slightly low.

Durability of the fuel cell may be improved by minimizing high potential exposure of the fuel cell through avoiding a low power output operation of the fuel cell.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
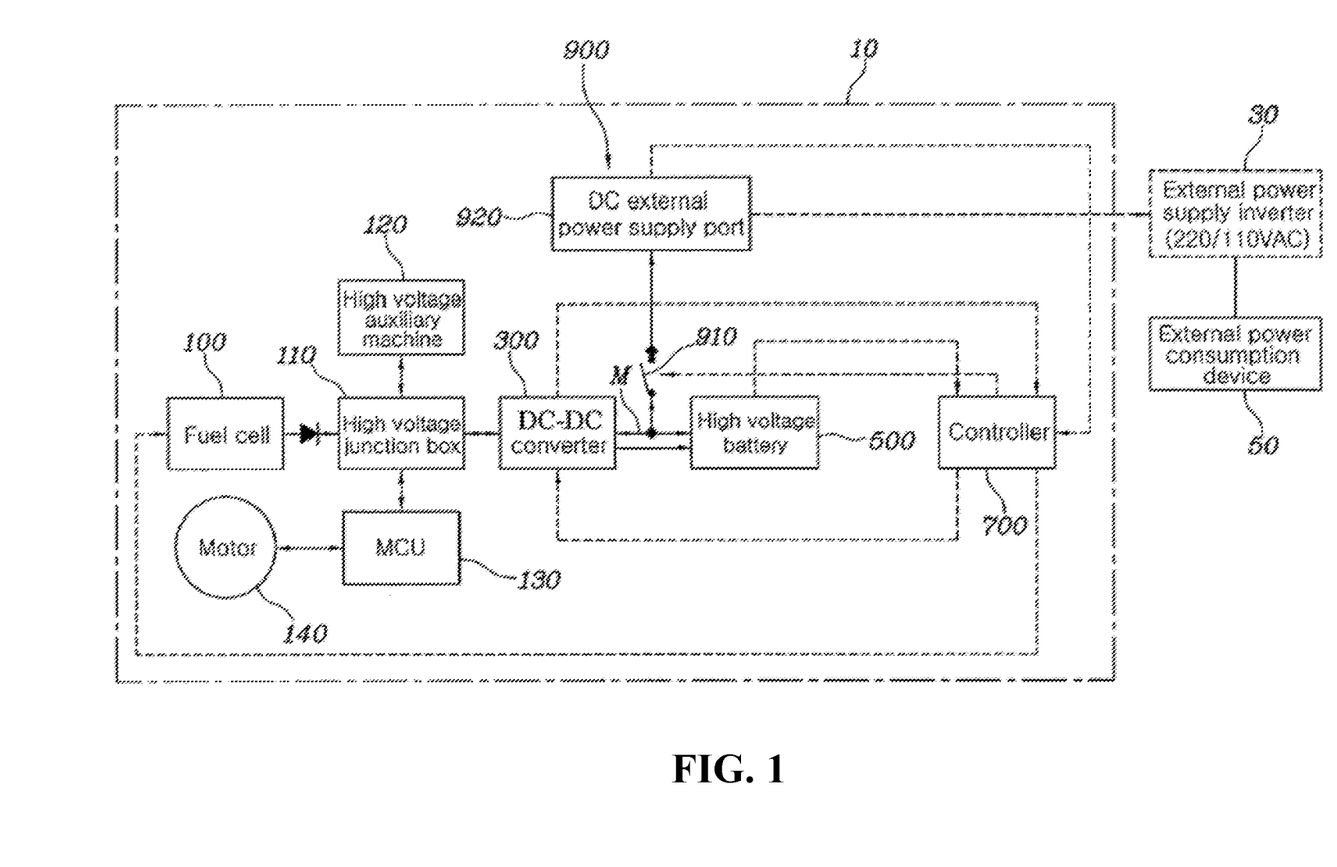
FIG. 1 is a configuration diagram of a power generation system of a fuel cell vehicle according to an embodiment of the present disclosure.
Figure 2:
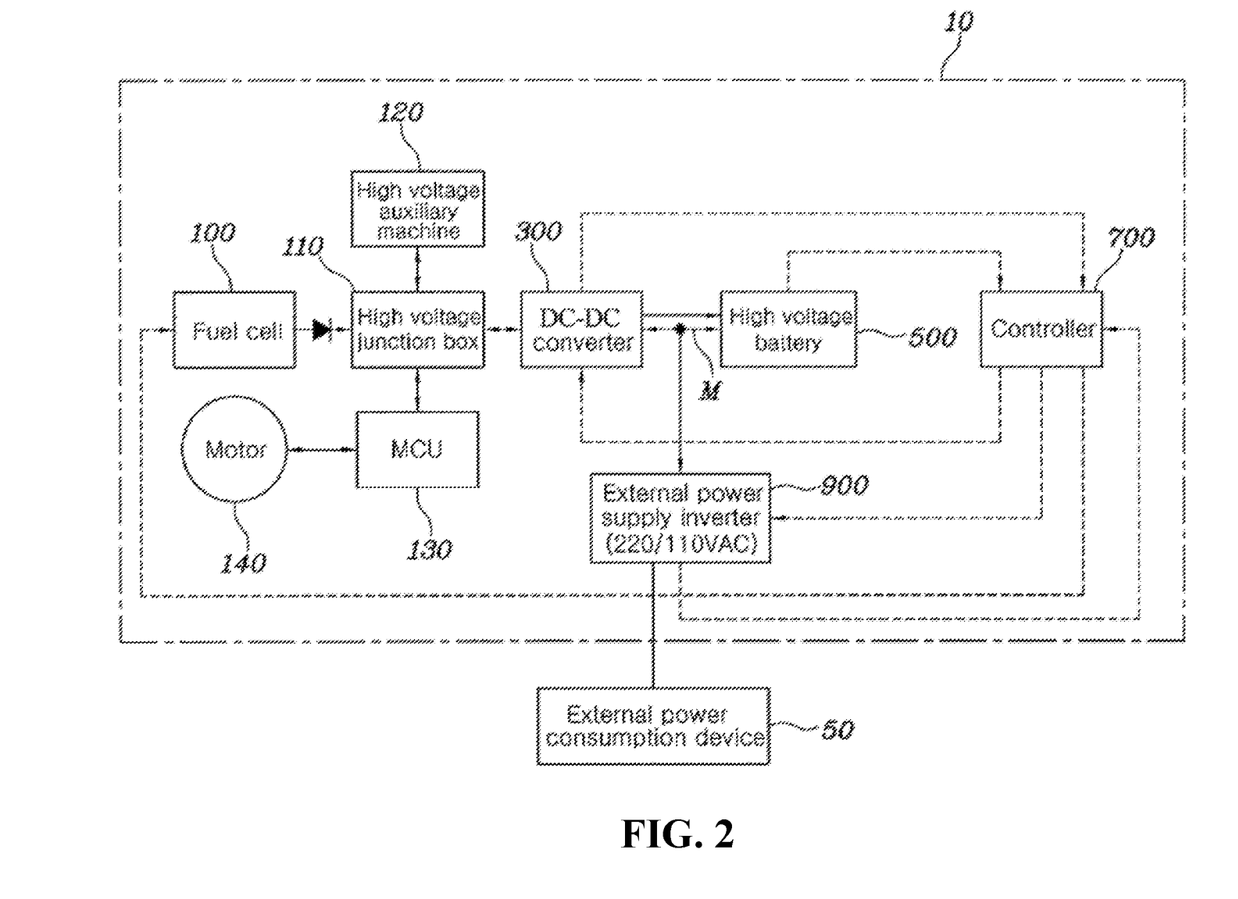
FIG. 2 illustrates another embodiment of a power generation system of a fuel cell vehicle according to an embodiment of the present disclosure.
Figure 3:
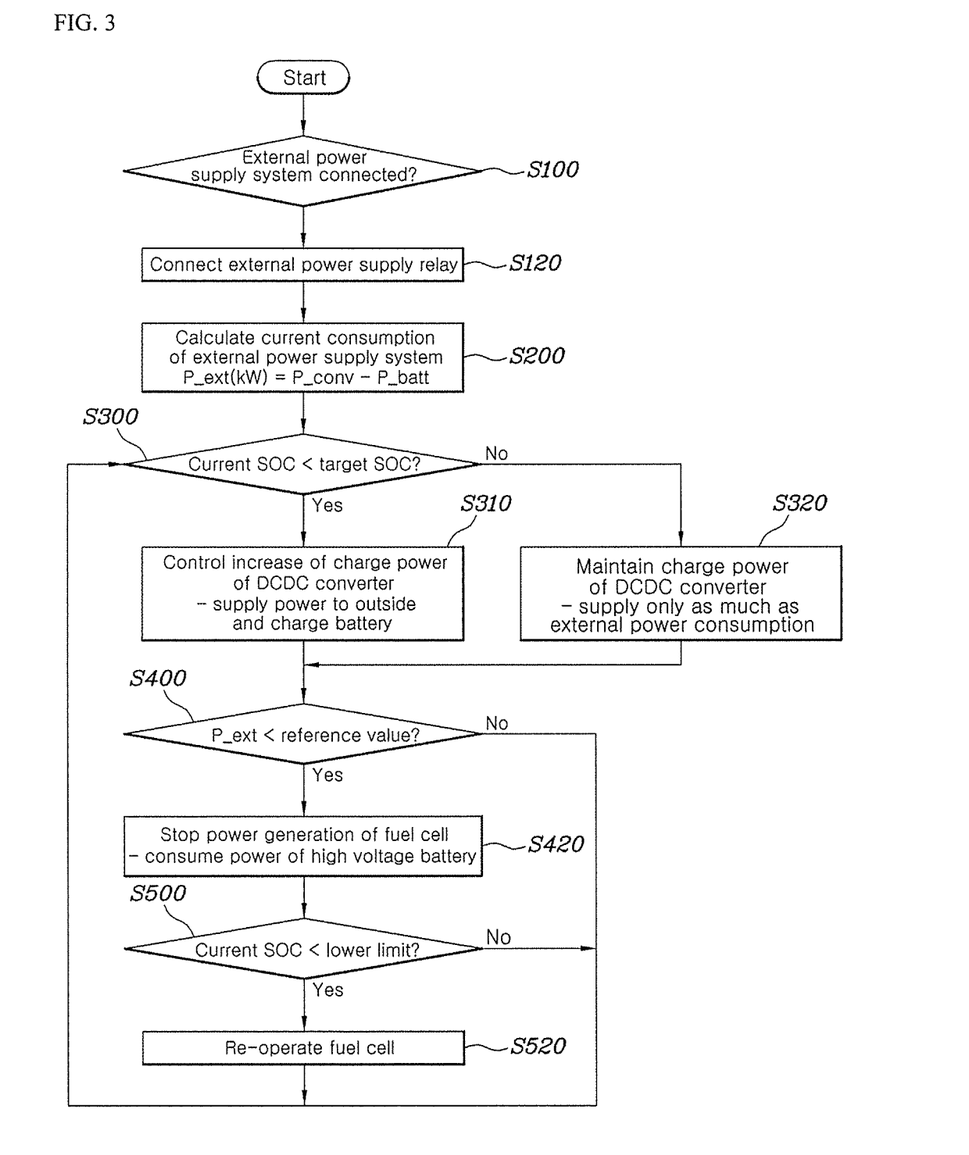
FIG. 3 is a flowchart of a power generation method of a fuel cell vehicle according to an embodiment of the present disclosure.
Figure 4:
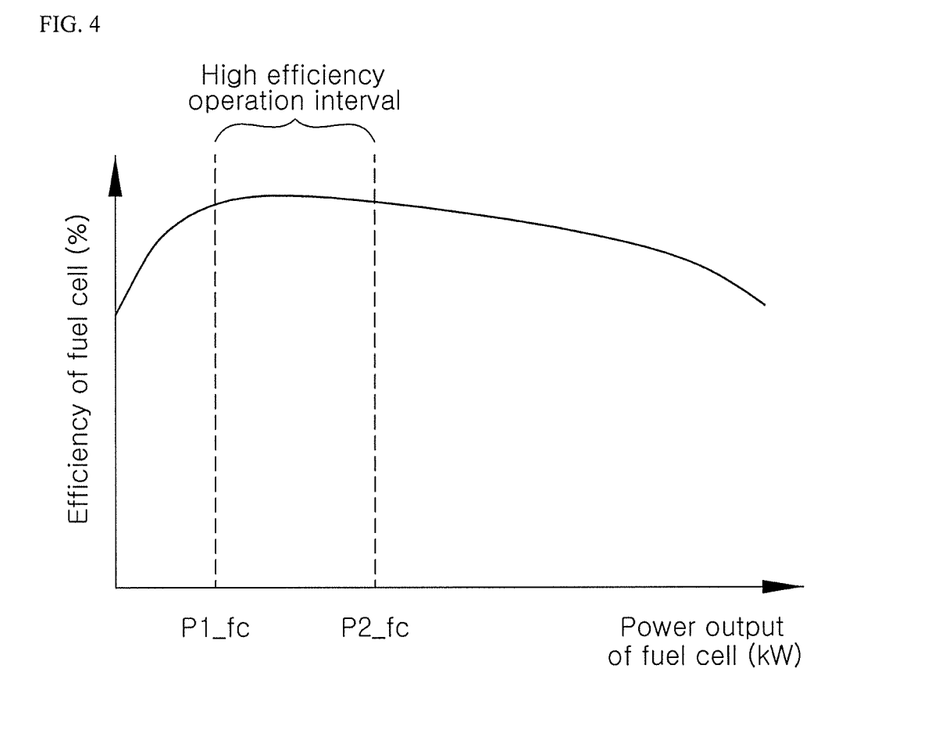
FIGS. 4 and 5 are graphs illustrating efficiency of a fuel cell or a high voltage DC-DC converter.
Figure 5:
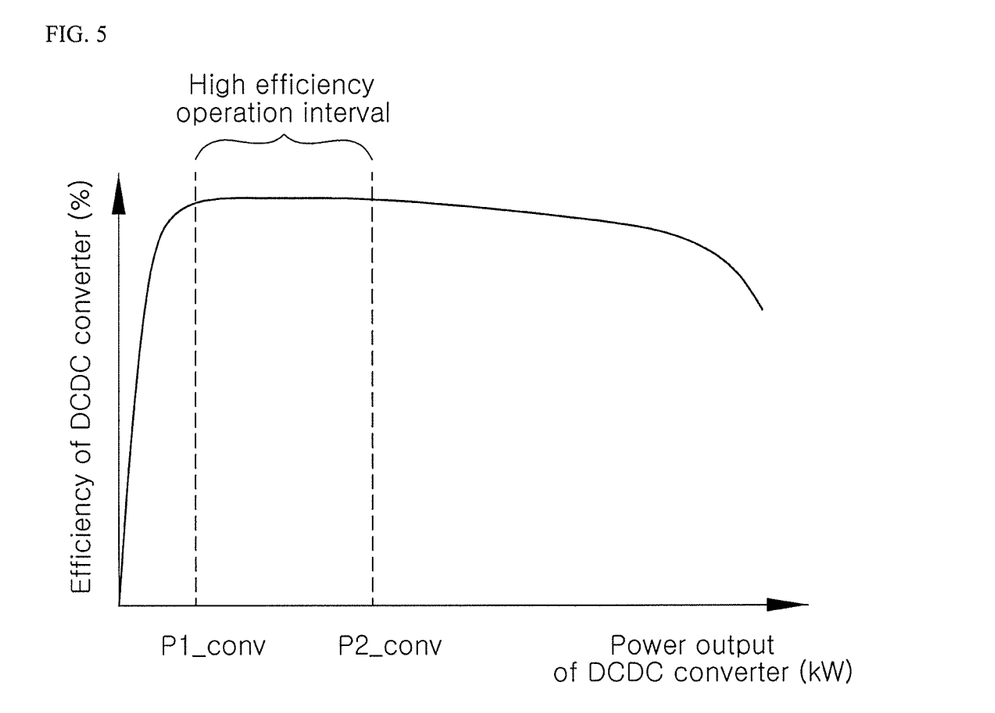

FIG. 1 is a configuration diagram of a power generation system of a fuel cell vehicle 10 according to an embodiment of the present disclosure, FIG. 2 illustrates another embodiment of a power generation system of a fuel cell vehicle 10 according to an embodiment of the present disclosure, FIG. 3 is a flowchart of a power generation method of a fuel cell vehicle according to an embodiment of the present disclosure, and FIGS. 4 and 5 are graphs illustrating efficiency of a fuel cell or a high voltage DC-DC converter.

FIGS. 1 and 2 illustrate configuration diagrams of a power generation system 10 of a fuel cell vehicle 10 according to an embodiment of the present disclosure, and describe different embodiments. A power generation system 10 for a fuel cell vehicle according to the present disclosure includes: a main line M that sequentially and electrically connects a fuel cell 100, a high voltage DC-DC converter 300, and a high voltage battery 500; an external power consumption device connecting unit 900 branched from a point between the high voltage DC-DC converter 300 and the high voltage battery 500 of the main line M and arranged to be electrically connected to the main line M; and a controller 700 that controls the fuel cell 100 or the high voltage converter 300 by selecting a mode for supplying power to an external power consumption device 50 by using only power generated by the fuel cell 100, a mode for supplying power to the external power consumption device 50 by using only the high voltage battery 500, or a mode for operating the fuel cell 100 or the high voltage DC-DC converter 300 in a high efficiency output interval, according to power consumption of the external power consumption device 50, when the external power consumption device 50 is connected to the external power consumption device connecting unit 900.

The present disclosure is to maximize power generation efficiency of a fuel cell 100 and energy efficiency of a high voltage battery 500 in a case of using a fuel cell vehicle for generating power, and an external power consumption device 50 connected to the vehicle.

According to the present disclosure, in the fuel cell vehicle including the fuel cell 100, a driving controller MCU 130 for driving, a driving motor 140, a high voltage junction box 110, an high voltage auxiliary machine 120, the high voltage battery 500, and the high voltage DC-DC converter 300, power consumption of the external power consumption device 50 is predicted when the vehicle has a power circuit for supplying power to the external power consumption device 50 and the power circuit is connected between the high voltage DC-DC converter 300 and the high voltage battery 500, or power consumption of the external power consumption device 50 may be derived by using a provided signal when each device provides pieces of information on voltage V and current A.

The controller 700 receives a signal indicating whether a connector of an external power supply device installed to an external power supply port/inverter is connected, and connects a power supply relay to supply power to the external power consumption device 50 when recognizing that the connector is mounted.

In the present disclosure, the main line M sequentially and electrically connects the fuel cell 100, the high voltage DC-DC converter 300, and the high voltage battery 500. Further, the external power consumption device connecting unit 900 is configured to be branched from a point between the high voltage DC-DC converter 300 and the high voltage battery 500 of the main line M and to be electrically connected to the main line M. FIG. 1 illustrates a case where the external power consumption device connecting unit 900 is an external power supply port 920 connected to the main line M through a relay 910. In this case, a separate external power supply inverter 30 is connected to the external power supply port 920 at the outside, and the external power consumption device 50 is connected to the external power supply inverter 30 and is used. Meanwhile, FIG. 2 illustrates a case where the external power consumption device connecting unit 900 is an external power supply inverter 900 connected to the main line M, and this case corresponds to a case where the external power supply inverter 900 is embedded in the vehicle. In this case, the external power consumption device 50 is directly connected to the external power supply inverter 900 of the vehicle and is used.

Meanwhile, the controller 700 manages energy flow. The controller 700 senses connection of the external power consumption device 50 when the external power consumption device 50 is connected to the external power consumption device connecting unit 900, and then derives power consumption of the external power consumption device 50. Also, the controller 700 implements a mode for supplying power to the external power consumption device 50 by using only power generated by the fuel cell 100 or selects a mode for supplying power to the external power consumption device 50 by using only the high voltage battery 500, or a mode for operating the fuel cell 100 or the high voltage DC-DC converter 300 in a high efficiency output interval, according to the derived power consumption of the external power consumption device 50. Then, the controller 700 controls whether to operate the fuel cell 100 or the high voltage DC-DC converter 300, and an operation method thereof according to the selected mode.

Particularly, the controller 700 includes a memory that stores data relating to a high efficiency output interval of the fuel cell 100 or a high efficiency output interval of the high voltage DC-DC converter, and a power deriving unit that derives power consumption of the external power consumption device 50. Further, the power deriving unit of the controller 700 may derive power consumption of the external power consumption device 50 from the difference between output power of the high voltage DC-DC converter and charge and discharge power of the high voltage battery.

In a case of charge and discharge power of the high voltage battery 500, the power deriving unit determines that the charge power corresponds to a positive number and the discharge power corresponds to a negative number, and calculates power consumption of the external power consumption device 50 by subtracting charge and discharge power of the high voltage battery 500 from output power of the high voltage DC-DC converter 300.

Further, in a case where the derived power consumption of the external power consumption device 50 is equal to or lower than a reference value, which means that a relatively small amount of energy is required, the controller 700 stops power generation of the fuel cell 100 for the energy efficiency. Instead, the controller 700 may select a mode for supplying power to the external power consumption device 50 by using only the high voltage battery 500 to resultantly stop the power generation of the fuel cell 100. This is because, in the case of small amount power generation which can be treated by only the high voltage battery 500 and cannot reach a high efficiency on an efficiency curve of the fuel battery, non-operation of the fuel cell 100 in consideration of the energy efficiency is more efficient.

For reference, FIGS. 4 and 5 are graphs illustrating efficiency of the fuel cell 100 or the high voltage DC-DC converter 300, and show that each of the fuel cell 100 and the high voltage DC-DC converter 300 has a highest efficiency in a particular output power interval. Accordingly, each interval is defined as a high efficiency interval and is stored in the memory in advance, so that the controller 700 determines an operation mode by referring to the same later.

Meanwhile, the reference value may be the lowest value in the high efficiency output interval of the fuel cell 100 or the high efficiency output interval of the high voltage DC-DC converter 300. Accordingly, the controller 700 stops power generation of the fuel cell 100 having a low efficiency and supplies power to the outside by using only the high voltage battery 500 when power consumption of the external power consumption device 50 is equal to or less than the reference value, that is, the lowest value in the high efficiency output interval of the fuel cell 100 or the high efficiency output interval of the high voltage DC-DC converter 300. Although energy loss may occur according to charge and discharge resistance loss of the high voltage battery 500 when the high voltage battery 500 stores energy and then the energy is discharged, it is more efficient to stop operation of the fuel battery 100 even allowing for this.

Also, in a case of selecting a mode for supplying power to the external power consumption device 50 by using only the high voltage battery 500, the controller 700 operates the fuel cell 100, and may charge the high voltage battery 500 while supplying power to the external power consumption device 50 by using power generated by the fuel cell 100 when a charge amount of the high voltage battery 500 is equal to or less than the minimum charge amount. That is, when a charge amount of the high voltage battery is too low in the middle of supplying power to the external power consumption device 50 by using only the high voltage battery, the controller 700 re-operates the fuel cell 100 in order to prevent degradation of the high voltage battery by considering driving of the vehicle or operation of the auxiliary machine later, and may charge the high voltage battery 500 while supplying power to the external power consumption device 50 by using power generated by the fuel cell 100.

Meanwhile, the controller 700 selects a mode for supplying power to the external power consumption device 50 by using only power generated by the fuel cell 100, and operates the fuel cell 100 or the high voltage DC-DC converter 300 in a high efficiency output interval when power consumption of the external power consumption device 50 is equal to or higher than the reference value. Particularly, in a case of selecting a mode for supplying power to the external power consumption device 50 by using only power generated by the fuel cell 100, the controller 700 charges the high voltage battery 500 while supplying power to the external power consumption device 50 by using power generated by the fuel cell 100 when a charge amount of the high voltage battery 500 is equal to or less than a target charge amount, and supplies power to the external power consumption device 50 but does not charge the high voltage battery 500 by using power generated by the fuel cell 100 when a charge amount of the high voltage battery 500 is equal to or higher than the target charge amount.

Since a case where power consumption of the external power consumption device 50 is equal to or higher than the reference value corresponds to a case where the fuel cell 100 or the high voltage DC-DC converter 300 may be operated in a high efficiency output interval, the controller 700 operates the fuel cell 100 and the high voltage DC-DC converter 300 in a high efficiency output interval and controls the fuel cell 100 and the high voltage DC-DC converter 300 such that power output in the high efficiency output interval corresponds to power consumption of the external power consumption device 50.

Further, in this process, when a charge amount of the high voltage battery 500 is equal to or less than the target charge amount, the controller 700 controls the fuel cell 100 and the high voltage DC-DC converter 300 to increase an amount of power generation such that the controller 700 charges the high voltage battery while supplying power to the external power consumption device 50 by using power generated by the fuel cell 100.

In other words, frequent charging and discharging of the high voltage battery may be prevented and the entire energy use efficiency may be thus improved by controlling the fuel cell vehicle, as described above. This is due to a case when energy flows through the battery instead of directly flowing to a place for use, which is unfavorable in terms of energy efficiency. In addition, heat loss is reduced and energy waste is thus minimized by operating the fuel cell 100 and the high voltage DC-DC converter 300 at maximum efficiency.

Nevertheless, the controller 700 may enable the high voltage battery to always maintain its minimum proper charge amount, so that drivability or durability of the vehicle is not affected.

Meanwhile, FIG. 3 is a flowchart of a power generation method of the fuel cell vehicle according to an embodiment of the present disclosure, and a power generation method using the power generation system of the fuel cell vehicle 10 according to the present disclosure includes: checking whether the external power consumption device 50 is connected to the external power consumption device connecting unit 900, S100; deriving power consumption of the external power consumption device 50, S200, when the external power consumption device 50 is connected to the external power consumption device connecting unit 900, S120; and supplying power to the external power consumption device 50 by operating the fuel cell 100 or the high voltage DC-DC converter in a high efficiency output interval, or supplying power to the external power consumption device 50 by using only the high voltage battery 500, according to the size of power consumption of the external power consumption device 50.

Supplying of the power to the external power consumption device 50 may include supplying power to the external power consumption device 50 by using only the high voltage battery 500, S420 when power consumption of the external power consumption device 50 is equal to or less than the reference value, S400. However, operation of the fuel battery is required again when the high voltage battery lacks a charge amount, S500 and S520.

Supplying of the power to the external power consumption device 50 may include supplying power to the external power consumption device 50 while operating the fuel cell 100 or the high voltage DC-DC converter 300 in a high efficiency output interval when power consumption of the external power consumption device 50 is equal to or higher than the reference value, S320, and charging the high voltage battery while supplying power to the external power consumption device 50 by using power generated by the fuel cell 100 when a charge amount of the high voltage battery 500 is equal to or less than the target charge amount, S300 and S310.

The controller 700 adjusts a charge power of the high voltage DC-DC converter and supplies the charge power having an amount corresponding to power consumption of the external power consumption device 50 to a battery bus terminal when power consumed by the external power supply system exists within the high efficiency operation interval of the fuel cell 100 (P1_fc~P2_fc of FIG. 4). Since this interval satisfies high efficiency intervals of the fuel cell 100 and the high voltage DC-DC converter, power of the fuel cell 100 is directly supplied to the external power consumption device 50, and a charge and discharge power of the battery is minimized, thereby improving efficiency.

When charging and discharging of the high voltage battery are repeated, voltage loss occurs due to an internal resistance of the high voltage battery, and energy is thus decreased to be lower than the originally charged energy due to voltage loss when energy stored in the high voltage battery though charging flows to the outside again. Therefore, the controller 700 should control the high voltage battery not to be charged and discharged by a small amount of energy in a short period of time.

That is, the controller 700 performs a power distribution control such that the fuel cell 100 operates in a high efficiency operation interval (P1_fc~P2_fc of FIG. 4) and a DC-DC converter operates in a high efficiency operation interval (P1_conv~P2_conv of FIG. 5) when power consumption of the external power consumption device 50 is slightly large. Further, the controller 700 stops an operation of the fuel cell 100, and performs a power distribution control to supply power by using only energy stored in the high voltage battery when power consumption of the external power consumption device 50 is slightly small (less than P1_fc of FIG. 4).

A power generation system 10 and a power generation method for a fuel cell vehicle according to the present disclosure provides an effect of improving the entire system efficiency by supplying power within high efficiency operation intervals (e.g. between output powers P1 and P2 in FIGS. 4 and 5) of the fuel cell 100 and the high voltage DC-DC converter 300 when the power is supplied to an external power consumption device 50.

Low power output and low efficiency operation of the fuel cell 100 are prevented by temporarily stopping operating the fuel cell 100 and directly supplying power of a high voltage battery 500 to the external power consumption device 50 when power consumption of the external power consumption device 50 is slightly low.

Durability of the fuel cell 100 may be improved by minimizing high potential exposure of the fuel cell 100 through avoiding a low power output operation of the fuel cell 100.

A particular embodiment of the present disclosure has been illustrated and described, but various changes and modifications would be obvious to one of ordinary skill in the art without departing from the technical idea of the present disclosure, provided by the following claims.

What is claimed is:

1. A power generation system for a fuel cell vehicle, the power generation system comprising:
   a main line configured to sequentially and electrically connect a fuel cell, a high voltage DC-DC converter, and a high voltage battery;
   an external power consumption device connecting unit configured to be branched from a point between the high voltage DC-DC converter and the high voltage battery of the main line and to be electrically connected to the main line; and
   a controller configured to control the fuel cell or the high voltage DC-DC converter by selecting a mode for supplying power to an external power consumption device by using only power generated by the fuel cell, a mode for supplying power to the external power consumption device by using only the high voltage battery, or a mode for operating the fuel cell or the high voltage DC-DC converter in a high efficiency output interval, according to power consumption of the external power consumption device, when the external power consumption device is connected to the external power consumption device connecting unit,
   wherein the controller comprises a memory configured to store data relating to a high efficiency output interval of the fuel cell or a high efficiency output interval of the high voltage DC-DC converter, and a power deriving unit configured to derive power consumption of the external power consumption device.

2. The power generation system of claim 1, wherein the external power consumption device connecting unit is an external power supply port connected to the main line through a relay.

3. The power generation system of claim 1, wherein the external power consumption device connecting unit is an external power supply inverter connected to the main line.

4. The power generation system of claim 1, wherein the controller is configured to derive power consumption of the external power consumption device from the difference between output power of the high voltage DC-DC converter and charge or discharge power of the high voltage battery.

5. The power generation system of claim 1, wherein the controller is configured to stop power generation of the fuel cell by selecting a mode for supplying power to the external power consumption device by using only the high voltage battery when power consumption of the external power consumption device is equal to or less than a reference value.

6. The power generation system of claim 5, wherein the reference value is the lowest value in the high efficiency output interval of the fuel cell or the high efficiency output interval of the high voltage DC-DC converter.

7. The power generation system of claim 5, wherein, in a case of selecting a mode for supplying power to the external power consumption device by using only the high voltage battery, the controller is configured to operate the fuel cell, and charge the high voltage battery while supplying power to the external power consumption device by using power generated by the fuel cell when a charge amount of the high voltage battery is equal to or less than a minimum charge amount.

8. The power generation system of claim 1, wherein, when power consumption of the external power consumption device is equal to or higher than a reference value, the controller is configured to select a mode for supplying power to the external power consumption device by using only power generated by the fuel cell, in which the fuel cell or the high voltage DC-DC converter is operated in a high efficiency output interval.

9. The power generation system of claim 8, wherein, in a case of selecting a mode for supplying power to the external power consumption device by using only power generated by the fuel cell, the controller is configured to charge the high voltage battery while supplying power to the external power consumption device by using power generated by the fuel cell when a charge amount of the high voltage battery is equal to or less than a target charge amount.

10. A power generation method using the power generation system of the fuel cell vehicle of claim 1, the power generation method comprising:
    checking whether the external power consumption device is connected to the external power consumption device connecting unit;
    deriving power consumption of the external power consumption device when the external power consumption device is connected to the external power consumption device connecting unit; and
    supplying power to the external power consumption device by operating the fuel cell or the high voltage DC-DC converter in a high efficiency output interval, or supplying power to the external power consumption device by using only the high voltage battery, according to the size of power consumption of the external power consumption device.

11. The power generation method of claim 10, wherein supplying of the power to the external power consumption device comprises supplying power to the external power consumption device by using only the high voltage battery when power consumption of the external power consumption device is equal to or less than the reference value.

12. The power generation method of claim 10, wherein supplying of the power to the external power consumption device comprises supplying power to the external power consumption device while operating the fuel cell or the high voltage DC-DC converter in a high efficiency output interval when power consumption of the external power consumption device is equal to or higher than the reference value, and charging the high voltage battery while supplying power to the external power consumption device by using power generated by the fuel cell when a charge amount of the high voltage battery is equal to or less than the target charge amount.

* * * * *